Jan. 19, 1965  H. B. ELLIS  3,165,907
APPARATUS FOR STORING AND SHIPPING PERISHABLE MATERIAL
Filed May 29, 1961  2 Sheets-Sheet 1

INVENTOR.
HERBERT B. ELLIS
BY PARKER & CARTER
ATTORNEYS

Jan. 19, 1965     H. B. ELLIS     3,165,907
APPARATUS FOR STORING AND SHIPPING PERISHABLE MATERIAL
Filed May 29, 1961     2 Sheets-Sheet 2

INVENTOR.
HERBERT B. ELLIS
BY PARKER & CARTER
ATTORNEYS 3,165,907
APPARATUS FOR STORING AND SHIPPING
PERISHABLE MATERIAL
Herbert B. Ellis, Pasadena, Calif., assignor to Reliquefier Corporation, New York, N.Y., a corporation of New York
Filed May 29, 1961, Ser. No. 113,501
2 Claims. (Cl. 62—373)

My invention relates to improvements in method and apparatus for storing and shipping perishable material and has for one object to provide a storage or shipper container wherein frozen and fresh foodstuffs may be stored and shipped together and wherein the water of composition of the frozen foodstuff, frozen at temperatures far below zero degrees F. provides the refrigeration to maintain the fresh food at the desired above freezing low temperature.

Another object of the invention is to insure such movement of cold gas or cold air within the container so that the frozen food or the water of composition thereof may act effectively as a refrigerant to cool the fresh food.

Another object of the invention is to control the rate of heat exchange so that the fresh food will not be chilled below freezing and will remain at the desired point by heat exchange with the frozen food.

Other objects will appear from time to time throughout the specification and claims.

Figure 1:
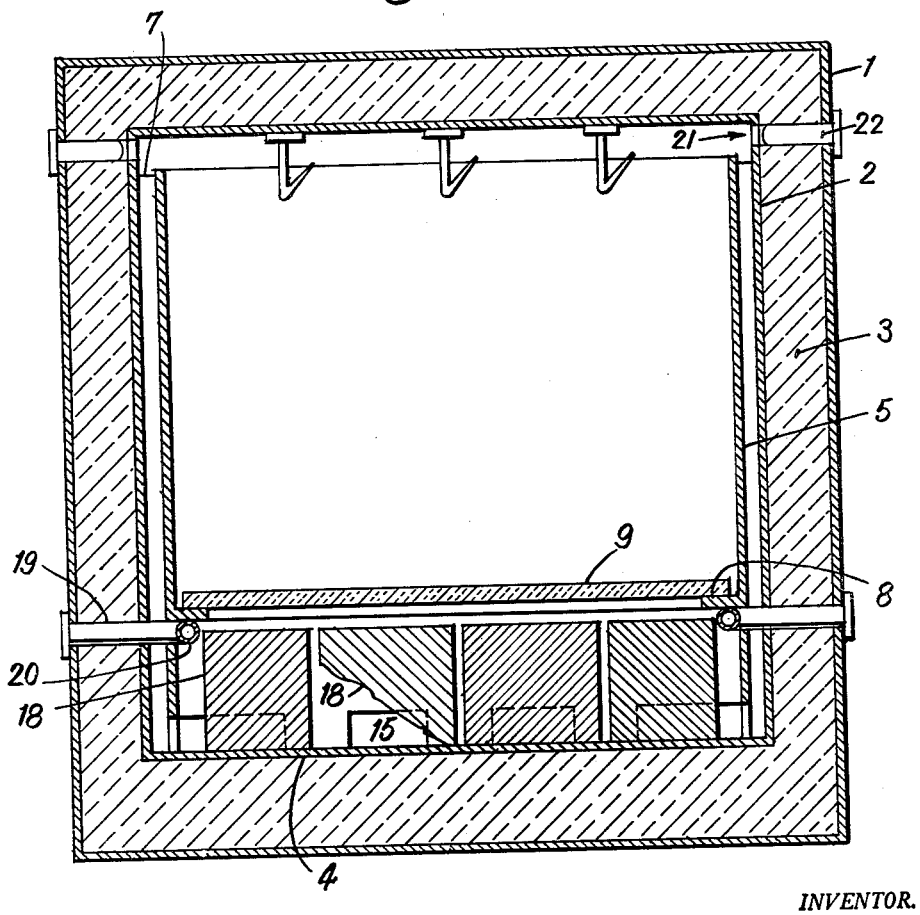
Figure 2:
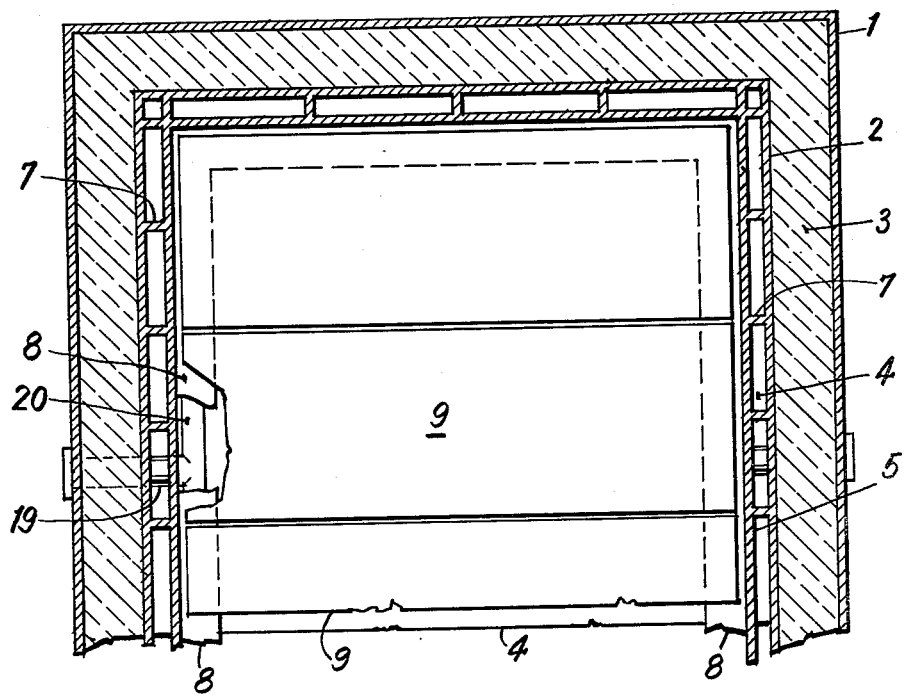

My invention is illustrated more or less diagrammatically in the accompanying drawings, wherein FIGURE 1 is a vertical section;

FIGURE 2 is a section along the line 2—2 of FIGURE 1.

Like parts are indicated by like numerals throughout the specification and drawings.

I have illustrated this invention with a shipper container box. It might equally well be a freight car, truck or trailer, airplane or a marine vessel. The principles involved are identical though the shape may differ.

The shipper container includes an outer shell 1, an inner lining 2, an insulation 3, between the top, bottom and sides of the outer shell and inner lining. Access doors will be provided but are not shown in the interest of clarity. Contained within the inner lining, extending upwardly from the floor 4 thereof toward, but terminating below the top is a cage 5. A plurality of vertically disposed partition walls 7, though they may be omitted, divide the vertical space between the cage 5 and the lining wall 2 into a multiplicity of parallel vertical flues bounded on one side by the heat conductive wall of the cage 5 and on the other side by the lining 2. Extending inwardly from the vertical walls of the cage 5 about its entire periphery spaced above the floor 4 are flanges 8 which support a plurality of removable floor planks 9, which planks divide the cage into an upper fresh food storage compartment and a lower frozen food storage compartment.

The vertical flues are open only as at 15 to the frozen food chamber adjacent the bottom thereof and open at their upper ends to communicate with the fresh food chamber.

When my shipper container is to be used, the planks 9 will be removed, the space below the flange will be filled with a plurality of frozen food packages 18 which may be pre-frozen or not as the case may be. When that area is filled, the planks 9 will be put in place to provide a floor and to separate the frozen food chamber below from the fresh food chamber above. Fresh food may be packed above the floor on pallets, if desired, or may be hung from the roof of the cage 5 by any suitable means not here illustrated.

After the two chambers are loaded and the container is closed, liquid nitrogen or some other suitable cold boiling, nondeleterious liquid will be discharged into the frozen food chamber just below the floor 9 through ducts 19 and distributed through foraminous distribution grid 20 at approximately atmospheric pressure and —320 degrees F., thus freezing the food and its water of composition down to a desired temperature far below zero degrees F. Thus the water of composition of the frozen food no matter how it is packed, serves as a permanent source of cold.

As the nitrogen evaporates, it passes up from the frozen food chamber through the flues or ducts between the cage and the wall of the frozen food chamber for discharge through the vent 21 which may well be closed with a check valve 22 to prevent entrance of air. This flow of gas will continue until the desired amount of liquid nitrogen, that is the amount necessary to bring the food down to the desired temperature, has been discharged. Thereafter the ducts will be closed and the entire assembly is ready for shipment with frozen food at the bottom, fresh food at the top and an atmosphere largely of gaseous nitrogen, the cold gaseous nitrogen having to a large extent displaced the air both in the upper and lower chambers.

After evaporation of liquid nitrogen has stopped and the container is closed, heat continues to enter through the insulation into the flue or flues. This causes by thermo-syphon effect an upward flow of gas along the relatively warm outer walls of the flues, entraining with it cold air from below from the frozen food chamber. The cold contents of the frozen food chamber starts off at a temperature such that the cage wall 5 will be at a lower temperature than the wall 2. The result is a continuous flow of gas upwardly along the wall 2, downwardly along wall 5. This flow will continue just as long as the temperature of the wall 2 is above the temperature of the wall 5. Thus cold gas is drawn up, brought into contact with the heat conductive wall 5 and cools that wall so that it serves as a cold plate to chill the relatively warm contents of the fresh food chamber.

Since the flues or ducts are open at their top to the fresh food chamber, there may be and frequently will be some spillage over of gas into the fresh meat chamber but again, since the meat is warmer than the cold gas given off by the frozen food, thermo-syphon effect will cause a similar movement of cold and warm gas, with the cold gas descending along the outer surface of the conducting plate 5 and ascending through the area in which the warm meat is contained.

Experience has taught that food shipped in this manner can be shipped clear across the continent without any additional refrigeration other than the cold liquid water of composition of the frozen food and the frozen food arrives at below zero degrees F. and the fresh food in the order of 35 degrees F.

The floor between the frozen food chamber or zone and the fresh food chamber or zone being removable and being necessarily removed in the structure shown to make it possible to insert the frozen food before the fresh food is loaded, may not be gas tight. It does not need to be. Any leakage through the floor, experience teaches will be so slight as not to interfere with the thermo-syphon effect.

The clearance between the container walls 2 and the conducting cage wall 5 whether with or without the dividing partition 7 defines one or more ducts or flues interposed between the fresh food chamber and the insulating walls which are exposed on the outside to the heat infiltrating through the insulation and on the inside to the relatively warm area in which the fresh food is located.

The temperature desired for delivery of the food is a variable depending upon the desire of the customer. Perhaps on the average fresh meat should be delivered at 35 degrees F. Certainly frozen food should be delivered at below zero degrees F. The more liquid nitrogen that is poured in, the lower the temperature of the frozen food. The longer the material is to remain in storage and transit, the lower the temperature desired. Since the insulation characteristic of the container is known and since the conditions of storage and shipment may be predicted, it is a simple enough matter to determine just what temperature is desired as the minimum in order to arrive at destination with the desired temperature. The point is that no matter what that temperature is, the rate of heat flow or heat exchange between the two chambers is by thermo-syphon effect and the cold air or cold gas is forced upwardly by thermo-syphon effect from below where the cold is to above where the relatively warm food is.

I claim:

1. A shipper container including an insulated housing having insulating walls, means defining a storage chamber within said insulated housing and resting on the bottom wall of the housing, a horizontal partition dividing the storage chamber into a frozen food chamber below and a fresh food chamber above, said storage chamber defining means being spaced from the insulating walls to thereby define vertical flues between the storage chamber and the insulating walls, said vertical flues extending continuously from the bottom of the storage chamber to the top thereof alongside the frozen food and fresh food chambers, and including openings defined in the storage chamber at a point adjacent the bottom wall of the housing whereby said vertical flues communicate with the frozen food chamber at the bottom, said storage chamber defining means being open at the top for communication with said vertical flues, and wherein the horizontal partition inhibits gas flow between the frozen food and fresh food storage chambers.

2. In a shipper container, having insulated top, bottom and side walls, a cage formed of heat conductive side walls which are vapor impervious resting on the bottom wall and spaced inwardly from the side walls and terminating below the top wall to define a flue space in between extending continuously from the bottom to the top of the cage, a horizontal flange extending inwardly from the side walls of the cage and extending about the periphery thereof, a removable floor supported by the flange and dividing the cage into a lower frozen food chamber and an upper fresh food chamber, ports in the side walls of the cage in register with the lower frozen food chamber, said flue space providing a free and unobstructed passage for gas, from the lower chamber, through the ports, through the flue space between the cage and the container walls to the top of the fresh food chamber, the floor inhibiting gas flow directly between the two chambers, and including means for introducing expendable refrigerant liquid into the frozen food chamber.

References Cited in the file of this patent

UNITED STATES PATENTS

| | | |
|---|---|---|
| 653,119 | Reeves | July 3, 1900 |
| 1,314,108 | Walty | Aug. 26, 1919 |
| 1,752,015 | Martin | Mar. 25, 1930 |
| 1,825,073 | Killeffer | Sept. 29, 1931 |
| 1,952,026 | Bennett | Mar. 20, 1934 |
| 1,969,580 | Robertson | Aug. 7, 1934 |
| 2,325,371 | Clerc | July 27, 1943 |
| 2,565,995 | Spencer | Aug. 28, 1951 |
| 2,586,893 | Westling | Feb. 26, 1952 |
| 2,959,034 | Morrison | Nov. 8, 1960 |
| 3,022,637 | Morrison | Feb. 27, 1962 |